UNITED STATES PATENT OFFICE.

EMILE AUGUSTE FOURNEAUX, OF MANCHESTER, ENGLAND.

PRODUCTION OF BLACK UPON TEXTILE FIBERS.

14,824. Specification of Reissued Letters Patent. Reissued Mar. 23, 1920.

No Drawing. Original No. 1,277,056, dated August 27, 1918, Serial No. 185,238, filed August 9, 1917. Application for reissue filed August 14, 1919. Serial No. 317,520½.

*To all whom it may concern:*

Be it known that I, EMILE AUGUSTE FOURNEAUX, a subject of the King of Great Britain, residing at St. James's Building, Oxford street, Manchester, in the county of Lancaster, England, have invented new and useful Improvements in the Production of Black upon Textile Fibers, of which the following is a specification.

My invention relates to improvements in the production of anilin black upon vegetable textile fibers.

The known processes for the production of ungreenable anilin blacks having little or no tendering effect on the fiber do not appear to have proved entirely satisfactory in practice.

A number of them depend on after treatments, such as chroming, frequently in the presence of anilin, which load the fiber with mineral matter and are particularly objectionable if the black is to be applied for printing purposes or for discharge purposes, as they have a detrimental effect on the whites.

Other processes require special precautions in drying and aging and in some cases the necessary precautions can only be carried out by means of special and complicated apparatus. In many cases the results obtained when following the indications given in the specifications fall short of technical requirements.

After an extensive research I have succeeded in devising a process for the production of an ungreenable anilin black which has little or no tendering effect on the fiber, which does not require any after treatment whatever except washing and soaping, and which can be carried out with the ordinary machinery generally available in every print works, to wit, a padding mangle, a set of drying cans, a short steamer or anilin ager of the Mather and Platt type and the necessary washing and soaping machinery.

The new process is an improvement on the process of the previous British Patent No. 7345 of 1908 granted jointly to The Calico Printers' Association Limited and myself.

The said patented process was based on the discovery that anilin black mixtures containing not more than one molecular proportion of a strong mineral acid for three molecular proportions of anilin do not tender the fiber very materially provided they are of such composition as to lead to the rapid and smooth formation of ungreenable black under the conditions of development. In that patent it was assumed that under conditions favoring the rapid and smooth formation of ungreenable anilin black the oxids of chlorin produced from the chlorate by the action of the catalytic agent affect the bases by selective action in preference to the fiber, while under the opposite conditions the oxids of chlorin not being readily taken up by the bases attack the fiber and under such unsuitable conditions form a materially larger portion of oxycellulose than is formed in the application of the ordinary oxidation black.

My present process differs from the process of the previous British Patent No. 7345 of 1908 in the following particulars:—

1. I am now able to dispense with the use of metallic salts with an acid function, which was found undesirable in practice.

2. The proportion of organic catalytic agent required has been very materially reduced.

3. I now use boracic acid for the purpose of preventing undue loss of anilin in drying.

4. I now use copper salts as mineral catalytic agents in preference to vanadium salts.

These alterations have resulted in a very material improvement in the shade and fastness of the black, in the working qualities of the mixtures, (padding liquors and printing colors) and in a further material reduction of the danger of tendering.

In carrying my invention into effect I use mixtures consisting of—

(*a*) Anilin alone, or in admixture with other primary amins of the benzene series (but not aminodi-phenylamin compounds,) provided always that the proportion of amins substituted in para position in relation to the amino group does not exceed three molecular proportions out of a total of eleven molecular proportions of amins.

(*b*) A strong mineral acid used in such proportions as not to interfere materially with the condensation of the intermediary products of the nigranilin type with anilin to ungreenable anilin blacks. The acids best suited for my purpose are hydrochloric acid and nitric acid.

(*c*) Formic acid in such proportion as may be required jointly with the mineral acid to prevent the formation of any material amount of undesirable brown by-products.

(*d*) A suitable thickening and—

(*e*) Boracic acid for the purpose of preventing any undue loss of anilin during the drying operation and of retaining a proportion of amin sufficient to convert all the intermediary products of the nigranilin type formed into ungreenable anilin blacks. The boracic acid may be partly substituted by the phosphoric acids, preferably metaphosphoric acid.

(*f*) Chlorates of the alkali metals as oxidizing agents.

(*g*) An organic catalytic agent, preferably paraphenylene diamin, which may however be substituted by its known equivalents.

(*h*) A mineral catalytic agent, for padding purposes preferably a soluble copper salt. For printing purposes insoluble copper salts, preferably copper sulfid.

(*i*) For padding purposes the addition of lactic acid to the mixture has proved advantageous.

I am aware that the foregoing substances have been used in various mixtures for the production of anilin black and I wish it to be clearly understood that my invention is characterized by their application in such combinations and proportions that under the working conditions hereinafter specified the oxidation takes place rapidly, smoothly and completely, and that the resulting ungreenable anilin black is immediately practically free of the unstable intermediary products. The actual proportions of the constituents vary according to their nature and to other circumstances and for this reason I propose to give four typical mixtures under Examples 1–4, to state to what extent these mixtures may be modified without materially affecting the results obtained and to illustrate such modifications by Examples 5 to 8.

Examples 1 and 2 are typical of mixtures containing monoamins only. Examples 3 and 4 of mixtures containing monoamins and diamins other than paraphenylenediamin which is common to all the mixtures. Examples 1 and 3 are mixtures for padding purposes. Examples 2 and 4 mixtures for printing purposes.

The following modifications are permissible:—

1. The substances used may be substituted by their known equivalents as specified above. Such substitutions may in some cases imply a slight modification of the proportions of the substances used.

2. An alteration in the proportion of one of the constituents may to some extent be counterbalanced by a corresponding alteration in others.

3. Modifications in the proportion of any one substance may be beneficial for certain purposes, but generally speaking they are only permissible within relatively narrow limits.

With regard to (1): Owing to the fact that under my working conditions the formation of the intermediary products of the nigranilin series and their virtually complete condensation with primary amins to products of the ungreenable anilin black series takes place in one operation, the effect of the partial substitution of anilin by other bases is frequently much more pronounced than the effect of a similar substitution in ordinary anilin black mixtures. Such substitutions lead to useful results in a number of cases. Thus the use of dianisidin in connection with anilin, as illustrated by Examples 3 and 4, leads to very dense and very ungreenable blacks. Benzidin and tolidin give similar but somewhat browner shades of black. The partial substitution of anilin by the chloranilins, preferably orthochloranilin, leads to materially increased fastness to chlorin of the resulting black. The substitution of other soluble copper salts for the copper chlorid used in the examples is practicable, but the use of copper sulfate involves a slight reduction and the use of copper salts of weak acids a corresponding increase in the proportion of mineral acid. Similar alterations are necessary when substituting the copper sulfid by other insoluble copper salts. Generally speaking such substitutions are not beneficial. The use of mineral catalytic agents other than copper salts is possible, but on the whole detrimental.

With regard to (2): A reduction in the proportion of the mineral catalytic agent used may be compensated by a corresponding increase in the proportion of the organic catalytic agent, a reduction in the proportion of both catalytic agents by an increase in the proportion of chlorate, but such alterations are only permissible within relatively narrow limits.

With regard to (3): A slight increase in the proportion of strong mineral acid leads to bluer, if somewhat more greenable shades without necessarily increasing the danger of tendering very materially, especially if the proportion of chlorate be slightly reduced simultaneously. Any considerable increase in the proportion of strong mineral acid leads to greenable and tendering blacks, any material reduction in the proportion of strong mineral acid leads to dense but brownish blacks. The proportion of boracic acid may be materially reduced without any detrimental effect provided the material impregnated with the black mixture be dried at lower temperatures *i. e.*, drying by hot air instead of can drying. Except as specified above, any considerable alteration in the proportion of chlorate has a detrimental effect. The same remark applies to the proportions of the catalytic agents, though in this case the margin is somewhat wider.

These anilin black mixtures are applied to the fabric or fiber by printing, padding, or otherwise impregnating, then drying and developing by steaming in a short steamer or anilin ager of the Mather & Platt type. The material is then washed and soaped. The blacks may be steamed after aging if required and they are capable of being resisted by alkaline and reducing agents.

By using dilute black mixtures useful grays may be produced.

*Examples.*

Example No. 1—parts by weight: Starch thirty-five, gum dragon mucilage one hundred and fifty, anilin seventy four and one quarter, hydrochloric acid (thirty two degrees Twaddell) twenty four and three quarters, paraphenylene diamin hydrochlorid three and one quarter, formic acid (ninety per cent.) ninety, lactic acid (thirty per cent.) forty eight, boracic acid forty, sodium chlorate fifty two, copper chlorid eight and one-quarter. Water to bulk to one thousand parts.

Example No. 2—parts by weight: Starch seventy five, gum dragon mucilage three hundred, anilin sixty three and one half, hydrochlorid acid (thirty two degrees Twaddell) thirty nine and one-half, paraphenylene diamin hydrochlorid four and one-half, formic acid (ninety per cent.) forty, boracic acid thirty four, sodium chlorate forty one, copper sulfid paste (twenty four per cent.) forty. Water to bulk to one thousand parts.

Example No. 3—parts by weight: Anilin forty three and one-half, dianisidin nineteen and one-half, hydrochloric acid thirty-two degrees (Twaddell), twenty four and one quarter, paraphenylene diamin hydrochlorid one and three-quarters, formic acid (ninety per cent.) sixty five, lactic acid (thirty per cent.) thirty, boracic acid three, sodium chlorate twenty eight and one-quarter, copper chlorid seven and three-quarters. Thicken as required. Water to bulk to one thousand parts.

Example No. 4—parts by weight: Starch one hundred, gum dragon mucilage one hundred, British gum seventy, anilin fifty-eight and three quarters, dianisidin fifteen and one-half, hydrochloric acid (thirty two degrees Twaddell) fifty, paraphenylene diamin hydrochlorid four and one-half; formic acid (ninety per cent.) forty, boracic acid eighteen, sodium chlorate forty three and one-half, copper sulfid paste (twenty four per cent.) forty. Water to bulk to one thousand.

Example No. 5—parts by weight: Anilin seventy four and one-quarter, hydrochloric acid (thirty-two degrees Twaddell) twenty three and one quarter, paraphenylene diamin hydrochlorid three, formic acid (ninety per cent.) ninety, lactic acid (thirty per cent.) forty eight, boracic acid forty, sodium chlorate forty four and one-half copper chlorid twelve and one-quarter. Thicken as required. Water to bulk to one thousand parts.

Example No. 6—parts by weight: Anilin seventy four and one quarter, hydrochloric acid (thirty two degrees Twaddell) eighteen, paraphenylene diamin hydrochlorid three, formic acid (ninety per cent.) ninety, lactic acid (thirty per cent.) forty eight, metaphosphoric acid twelve and three-quarters, boracic acid twenty, sodium chlorate forty eight, copper chlorid eleven. Thicken as required. Water to bulk to one thousand parts.

Example No. 7—parts by weight: Starch eighty five, gum dragon mucilage three hundred and fifty, anilin sixty two and one-quarter, hydrochloric acid (thirty-two degrees Twaddell) forty and one-half, paraphenylene diamin hydrochlorid four and one-half, formic acid (ninety per cent.) forty, boracic acid twenty-five, sodium chlorate forty one, copper sulfid paste (twenty four per cent.) forty. Water to bulk to one thousand parts.

Example No. 8—parts by weight: Starch ninety, British gum eighty, anilin ninety two and one half, hydrochloric acid (thirty two degrees Twaddell) fifty five and one-quarter, paraphenylene diamin hydrochlorid five and one-half, formic acid (ninety per cent.) fifty, boracic acid fifty two, sodium chlorate fifty five, copper sulfid paste (twenty four per cent.) fifty. Water to bulk to one thousand parts.

In preparing the above mixtures the thickening agents should be made into a paste with part of the water and a little formic acid and boiled in the usual manner to form a thickening. The anilin, the acids and the salts of the bases may then be added to the warm thickening and dissolved; then cool and add the sodium chlorate in solution. The copper salt should only be added immediately before use.

Of the mixtures of the above Examples Nos. 2, 4, 7 and 8 are intended for printing, Nos. 1, 3, 5 and 6 for padding or otherwise impregnating fabrics. The fabrics are then dried and the black developed by steaming in a short steamer or anilin ager of the Mather & Platt type.

What I claim as my invention and desire to secure by Letters Patent of the United States is:—

1. A process of producing black upon vegetable textile fibers which consists in impregnating the fiber with a solution comprising anilin, strong mineral acid, formic acid, thickening, boracic acid, chlorates of the alkali metals, paraphenylenediamin and a copper salt, impregnating the textile fibers with such mixtures by any known process, then drying the impregnated fiber and developing by steaming in an anilin ager.

2. A process of producing black upon vegetable textile fibers which consists in impregnating the fiber with a solution comprising anilin, strong mineral acid, formic acid, thickening, boracic acid and phosphoric acid, chlorates of the alkali metals, paraphenylenediamin and a copper salt, impregnating the textile fibers with such mixtures by any known process, then drying the impregnated fiber and developing by steaming in an anilin ager.

3. A dyeing solution comprising the following components in the proportions by weight as stated, starch thirty five, gum dragon mucilage one hundred and fifty, anilin seventy four and one-quarter, hydrochloric acid (thirty two degrees Twaddell) twenty four and three-quarters, paraphenylenediamin hydrochlorid three and one-quarter, formic acid (ninety per cent.) ninety, lactic acid (thirty per cent.) forty eight, boracic acid forty, sodium chlorate fifty two, copper chlorid eight and one-quarter, and water to bulk to one thousand parts by volume.

4. A process of producing black upon vegetable textile fibers which consists in impregnating the fiber with a solution comprising a plurality of primary amins of the benzene series other than aminodiphenylamin compounds, strong mineral acid, formic acid, thickening, boracic acid, chlorates of the alkali metals, paraphenylenediamin and a copper salt, impregnating the vegetable textile fibers with such mixtures by any known process, then drying the impregnated fiber and developing by steaming in an anilin ager.

5. A process of producing black upon vegetable textile fibers which consists in impregnating the fiber with a solution comprising a plurality of primary amins of the benzene series other than aminodiphenylamin compounds, strong mineral acid, formic acid, thickening, boracic acid and phosphoric acid, chlorates of the alkali metals, paraphenylenediamin and a copper salt, impregnating the vegetable textile fibers with such mixtures by any known process, then drying the impregnated fiber and developing by steaming in an anilin ager.

In testimony whereof I have signed my name to this specification in the presence of two subscribing witnesses.

EMILE AUGUSTE FOURNEAUX.

Witnesses:
S. W. GILLETT,
HERBERT ROWLAND ABBEY.